(12) United States Patent
Hampton et al.

(10) Patent No.: US 10,743,557 B2
(45) Date of Patent: Aug. 18, 2020

(54) NUTMILK EXTRACTION DEVICE

(71) Applicants: Elizabeth Hampton, Portland, OR (US); Daniel Nicholson, Portland, OR (US)

(72) Inventors: Elizabeth Hampton, Portland, OR (US); Daniel Nicholson, Portland, OR (US)

( * ) Notice: Subject to any disclaimer, the term of this patent is extended or adjusted under 35 U.S.C. 154(b) by 417 days.

(21) Appl. No.: 15/709,142

(22) Filed: Sep. 19, 2017

(65) Prior Publication Data

US 2018/0077945 A1 Mar. 22, 2018

Related U.S. Application Data

(60) Provisional application No. 62/397,044, filed on Sep. 20, 2016.

(51) Int. Cl.
| | |
|---|---|
| *A23C 11/10* | (2006.01) |
| *A47J 19/00* | (2006.01) |
| *A47J 31/18* | (2006.01) |

(52) U.S. Cl.
CPC .......... *A23C 11/103* (2013.01); *A47J 19/005* (2013.01); *A47J 31/18* (2013.01)

(58) Field of Classification Search
CPC ............................ A23C 11/103; A47J 19/005
USPC .................................................. 99/495, 485
See application file for complete search history.

(56) References Cited

U.S. PATENT DOCUMENTS

| | | | | |
|---|---|---|---|---|
| 3,631,793 A | * | 1/1972 | Bednartz | A47J 31/0636 99/295 |
| 3,693,535 A | * | 9/1972 | Abel, Jr. | A47J 31/106 99/282 |
| 3,987,921 A | * | 10/1976 | Aichinger | B65D 41/04 215/307 |
| 4,821,630 A | * | 4/1989 | Roberts | A47G 19/14 206/0.5 |
| 6,283,013 B1 | * | 9/2001 | Romandy | A47J 31/0636 99/319 |
| 8,387,517 B2 | * | 3/2013 | Geissler | A47J 31/56 426/435 |
| D781,646 S | * | 3/2017 | Roth | D7/387 |
| D840,190 S | * | 2/2019 | Schueler | D7/400 |
| 2008/0294149 A1 | * | 11/2008 | Krolman | A01N 1/02 606/1 |
| 2015/0028140 A1 | * | 1/2015 | Monforte Duart | A47J 19/04 241/69 |
| 2015/0164129 A1 | * | 6/2015 | Kim | A47J 19/02 99/513 |
| 2015/0201668 A1 | * | 7/2015 | Chan | A47J 19/025 99/513 |
| 2016/0120353 A1 | * | 5/2016 | Kim | A47J 19/02 99/513 |
| 2018/0014695 A1 | * | 1/2018 | Gross | A47J 43/0716 |

\* cited by examiner

*Primary Examiner* — Tu B Hoang
*Assistant Examiner* — Alba T Rosario-Aponte
(74) *Attorney, Agent, or Firm* — Mark S Hubert

(57) ABSTRACT

A portable, unpowered, inexpensive, personal nut milk extraction device that maximizes the amount of milk that can be extracted from a nut such as an almond. It utilizes a collection vessel with a hanging filter bag that is twistably compressed by a series of polymer straps operatively engaged by a twistable cap on the vessel. An over-torque device prevents the filter bag and polymer straps from damage.

8 Claims, 14 Drawing Sheets

NUTMILK EXTRACTION DEVICE

FIELD

The present disclosure relates, in general, to a device for the extraction of milk from nuts, and more particularly to almond milk press technology.

BACKGROUND

It is known that nutmilks such as almond milk, is replete with vitamins like calcium, iron, magnesium, phosphorus, potassium, sodium, and zinc. The other nutrients available therein include vitamins such as vitamin C, B-6, thiamine, riboflavin, niacin, folate and vitamin E. All these nutrients have beneficial effects, essential for healthy bodies. One cup of almond milk contains only 60 calories, and has no cholesterol or saturated fat. It's low in sodium and high in healthy fats (such as omega fatty acids, typically found in fish), which helps to prevent high blood pressure and heart disease. One glass has 30 percent of the recommended daily amount, as well as 25 percent of the recommended amount of vitamin D, reducing the risk for arthritis and osteoporosis as well as improving the body's immune function.

Almond milk contains 50 percent of the recommended daily amount of vitamin E, which contains antioxidant properties essential to your skin's health, such as protecting it against sun damage. It is low in carbs, has no lactose and has a low glycemic index. It has almost one gram of fiber per serving, which is important for healthy digestion. Most importantly—it does not require refrigeration.

The downfalls are that it is not readily available everywhere and where it is available, it often is not fresh because of the low demand. Since it is processed in smaller batches it can be expensive. Commercial extraction devices are expensive, large and require a power source. Since almond milk is derived from a nut, it can, in its unprocessed, ground form, be transported anywhere and freshly extracted if one had a portable extraction device.

Henceforth, a portable, unpowered, inexpensive, personal nutmilk extraction device that maximizes the amount of milk that can be extracted from a nut such as an almond, would fulfill a long felt need. This new invention utilizes and combines known and new technologies in a unique and novel configuration to overcome the aforementioned problems and accomplish this.

BRIEF SUMMARY

In accordance with various embodiments, a manually operated, portable nutmilk extraction device is provided.

In one aspect, an inexpensive nutmilk extraction device that can process personal amounts of nutmilk in a compact profile, is provided.

In another aspect, a nutmilk extraction device is provided, capable of visual verification of the extraction process.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "overtorque protection means" as used herein refers to a design feature of the structure of the torque cap and the vessel that prevents the over twisting of the twist body and filter body.

The present invention relates to a novel design for a personal nutmilk extraction device. While certain features and aspects have been described with respect to exemplary embodiments, one skilled in the art will recognize that numerous modifications are possible. While certain functionality is ascribed to certain system components, unless the context dictates otherwise, this functionality can be distributed among various other system components in accordance with the several embodiments.

Looking at FIGS. 29-32, the sequential assembly of the six parts of the nutmilk extraction device 2 can best be seen. The nutmilk extraction device 2 has a stylized open top collection vessel 4 that internally houses (sequentially, in a concentric nesting arrangement) a twist body 6, a filter body 17, a torque rod 10 and a top mounted torque cap 8. There is also an optional flexible polymer bottom cup 9 that serves to encircle the exterior bottom end of the collection vessel and provide a surface gripable shock absorbing outer layer. The torque cap 8 operationally mounts to the collection vessel 4 so that a portion of its body is within the collection vessel 4 and the remaining portion resides atop the collection vessel. The collection vessel 4 houses the remaining components so at to allow for the collection of any fluid extracted in the twisting and compression process with the soaked nut fines (pulp). The individual five parts will be discussed hereafter.

The collection vessel 4 is an open top cylindrical vessel with a planar bottom 44. (FIGS. 1-5) It has a narrowed top neck 16 that is circular about its exterior face 46, but has an tapered oval interior face 48. The tapered oval interior face 48 is configured for mating seating of the tapered oval upper ring 18 of the twist body 6 into the collection vessel 4. The bottom of the collection vessel 4 has a smaller diameter circular bottom ring 50 with a circular outer diameter sized for frictional engagement with the inner face of the polymer bottom cup 9. 180 degrees apart on the side walls of the collection vessel 4 are two concave grips 52. These serve to prevent the twisting of the collection vessel 4 in the user's hands when torque is applied to the twist body 6 via the torque cap 8 and torque rod 10 to generate nutmilk.

The bottom cup 9 is a right circular cylinder with a solid bottom 54 made of an elastically deformable polymer. (FIGS. 11-14) It preferably has a matte or flat surface finish and is made of a lower durometer polymer so as to be "grippy" onto surfaces it encounters. Its interior dimensions are sized for frictional engagement with the exterior face of the circular bottom ring 50. Preferably the cup 9 will be made of a silicone polymer with a material in the 30-75 range of the Type 00 durometer scale (Shore Hardness Scale) based on the ASTM D2240 standard. This range of material hardness allows for enough compressibility so the bottom cup 9 can act as a shock absorber for the bottom of the collection vessel 4. In this way the collection vessel may even be made of glass, although in the preferred embodiment it will be a resilient polymer like an acrylic.

Figures 1, 2, 3, 4, 5:
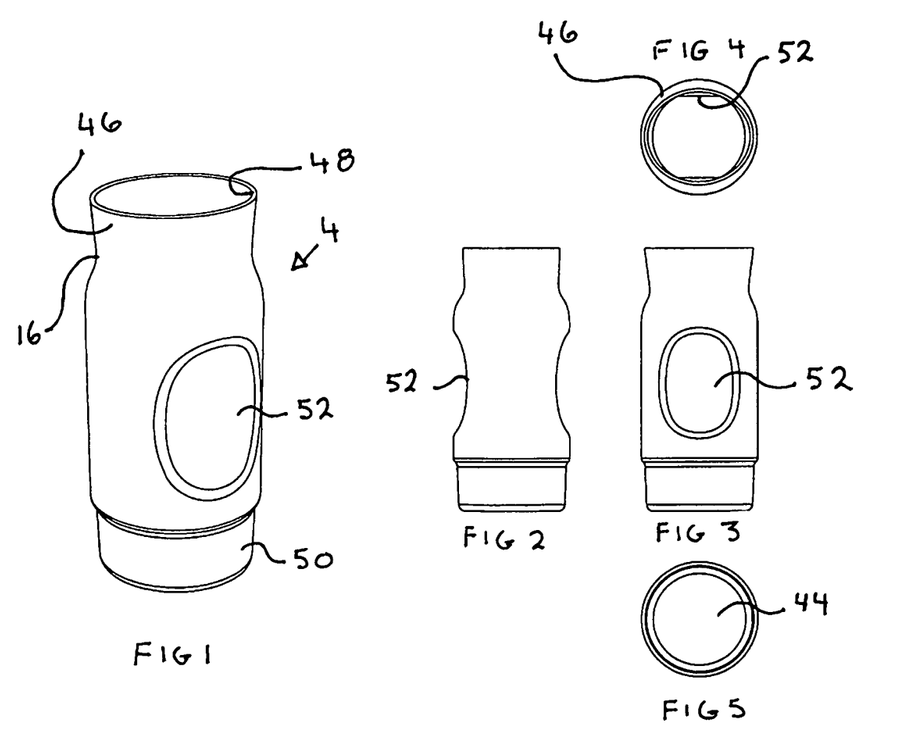
FIG. 1 is a front perspective view of the nutmilk extraction collection vessel.
FIGS. 2 and 3 are side views of the nutmilk extraction collection vessel.
FIG. 4 is a top view of the nutmilk extraction collection vessel.
FIG. 5 is a bottom view of the nutmilk extraction collection vessel.
Figure 6:
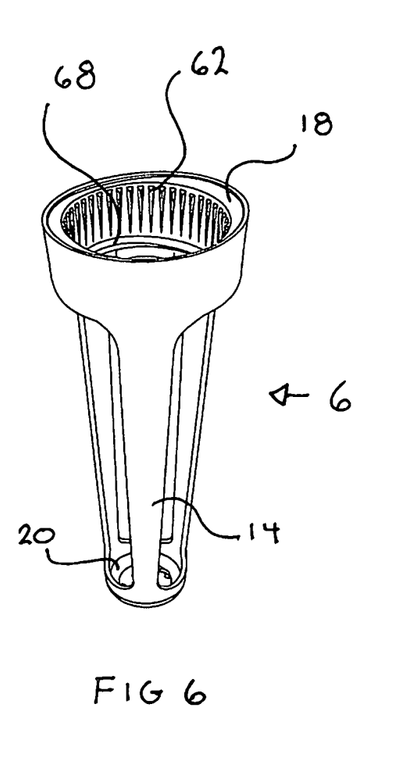
FIG. 6 is a front perspective view of the nutmilk extraction twist body.
Figure 7:
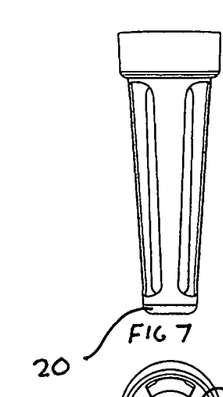
FIGS. 7 and 8 are side views of the nutmilk extraction twist body.
Figure 8:
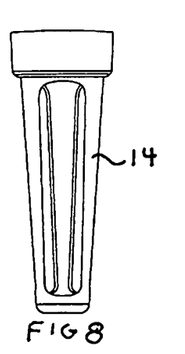
Figure 9:
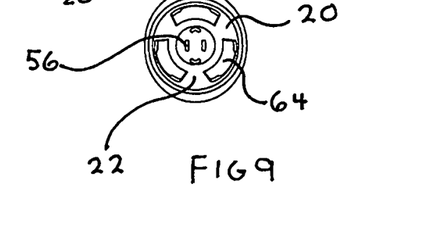
FIG. 9 is a bottom view of the nutmilk extraction twist body.
Figure 10:
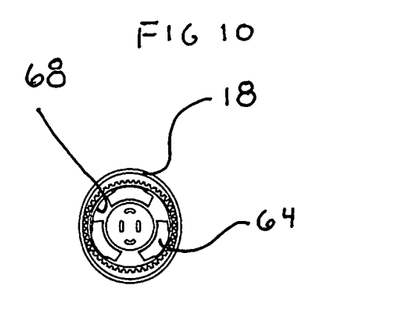
FIG. 10 is a top view of the nutmilk extraction twist body.
Figure 11:
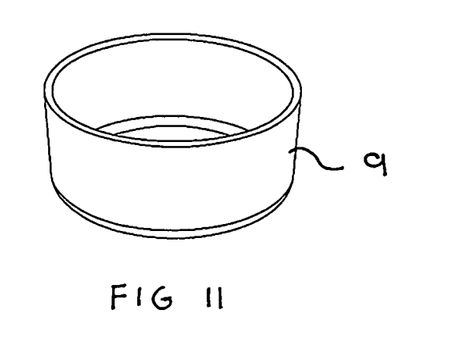
FIG. 11 front perspective view of the bottom cup.
Figure 12:
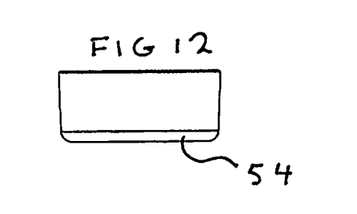
FIG. 12 is a side view of the bottom cup.
Figure 13:
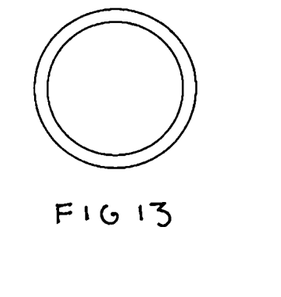
FIG. 13 is a bottom view of the bottom cup.
Figure 14:
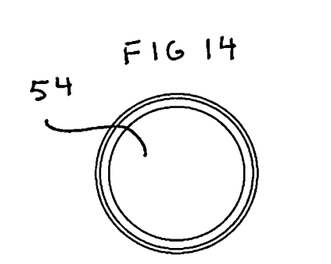
FIG. 14 is a top view of the bottom cup.
Figures 15, 16, 17, 18, 19:
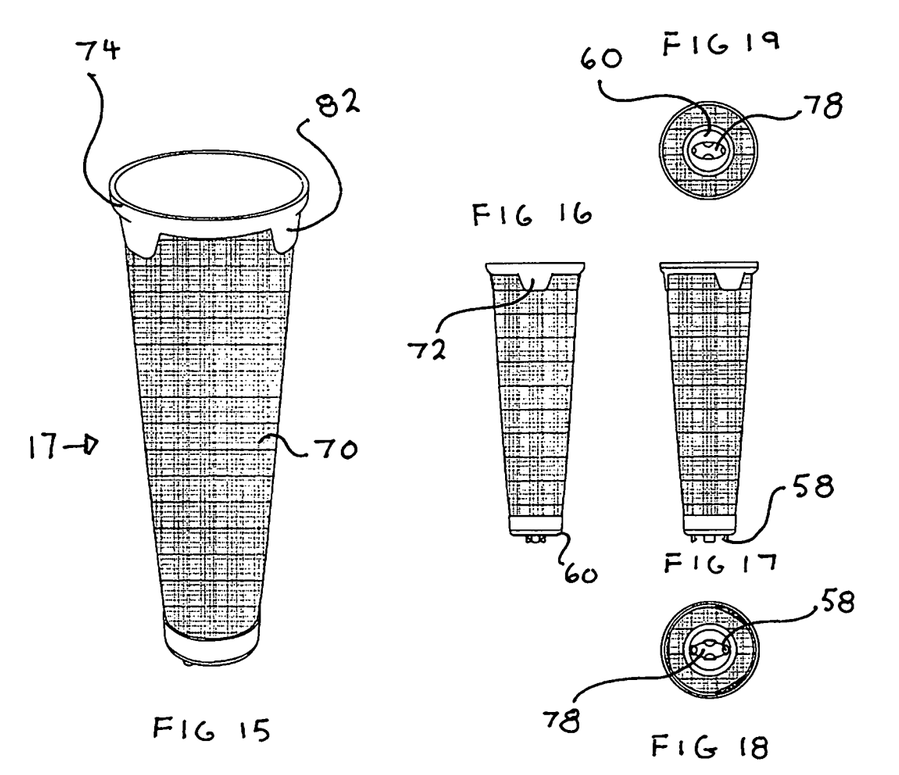
FIG. 15 is a perspective front view of the filter body.
FIGS. 16 and 17 are side views of the filter body.
FIG. 18 is a bottom view of the filter body.
FIG. 19 is a top view of the filter body.
Figure 20:
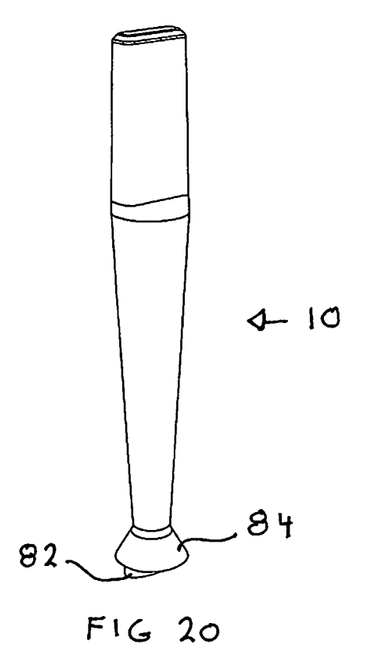
FIG. 20 is a front perspective view of the torque rod.
Figure 21:
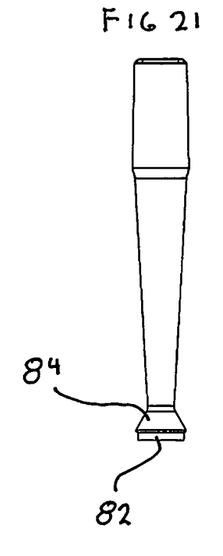
FIGS. 21 and 22 are side views of the torque rod.
Figure 22:
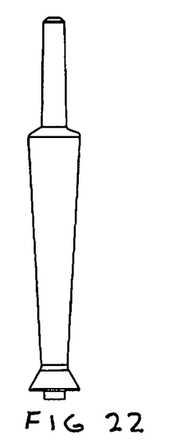
Figure 23:
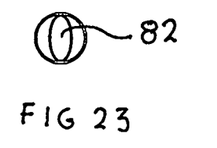
FIG. 23 is a bottom view of the torque rod.
Figure 24:
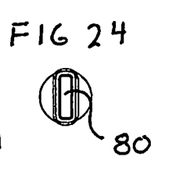
FIG. 24 is a top view of the torque rod.
Figure 25:
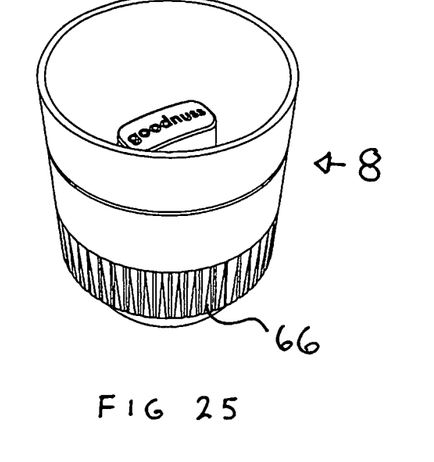
FIG. 25 is a front perspective view of the torque cap.
Figure 26:
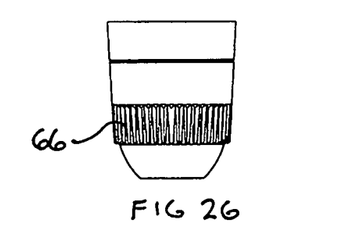
FIG. 26 is a side view of the torque cap.
Figure 27:
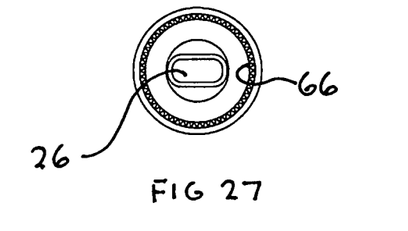
FIG. 27 is a bottom view of the torque cap.
Figure 28:
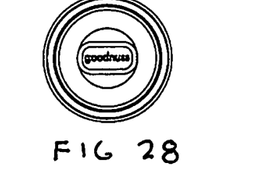
FIG. 28 is a top view of the torque cap.
Figure 29:
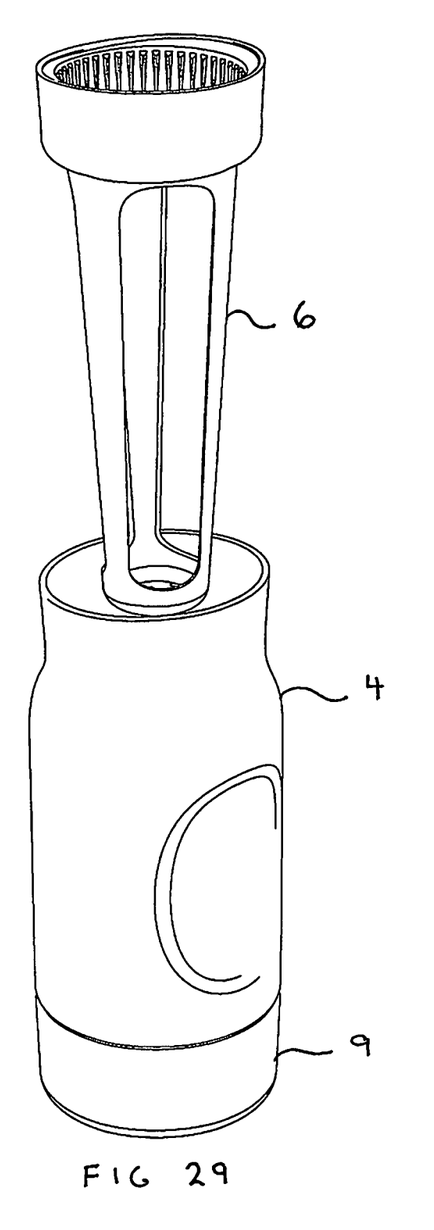
FIG. 29 is an assembly view of the twist body going into the vessel.
Figure 30:
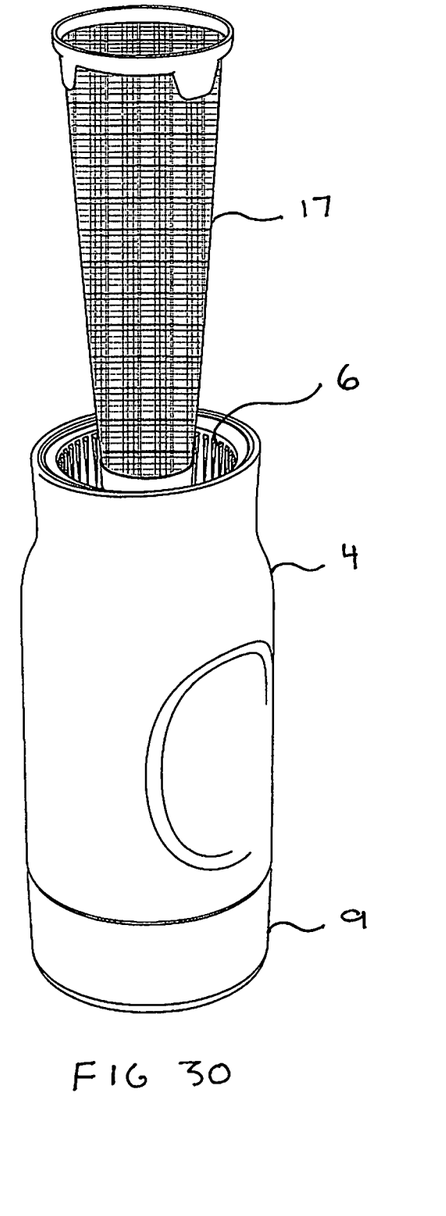
FIG. 30 is an assembly view of the filter body going into the twist body.
Figure 31:
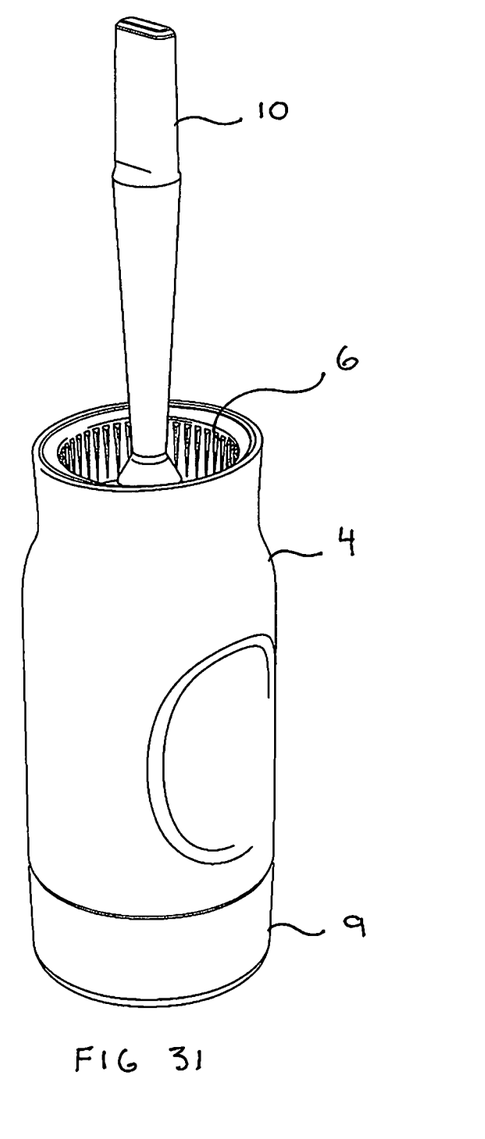
FIG. 31 is an assembly view of the torque rod going into the filter body.
Figure 32:
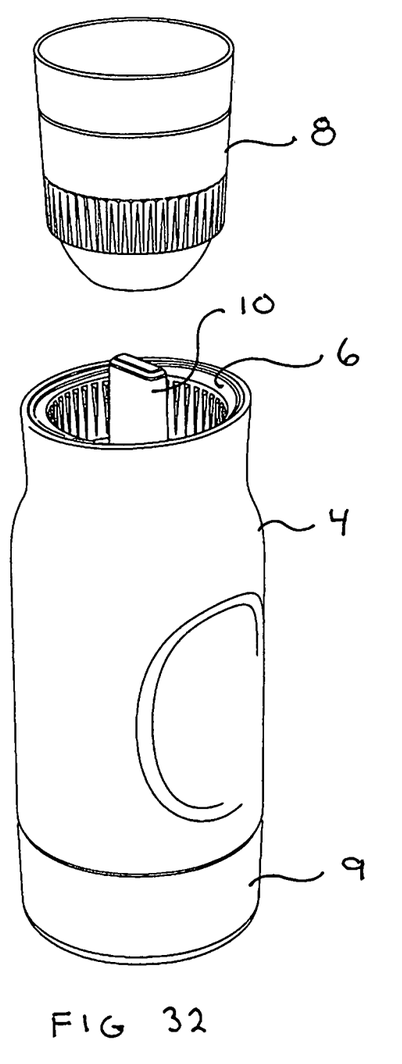
FIG. 32 is an assembly view of the torque cap going onto the torque rod and vessel.
Figure 33:
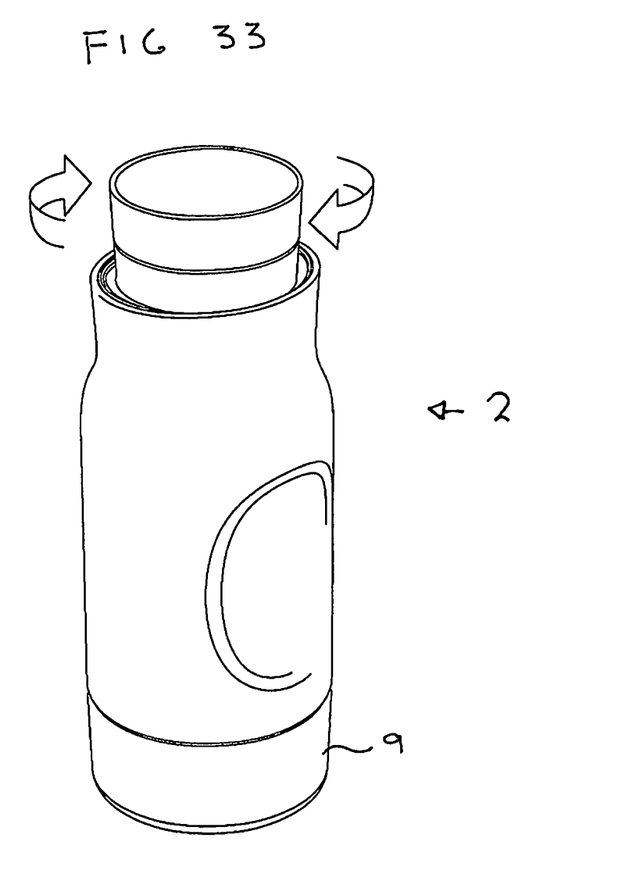
FIG. 33 is an assembly view of the torque cap being rotated in the twist body.
Figure 34:
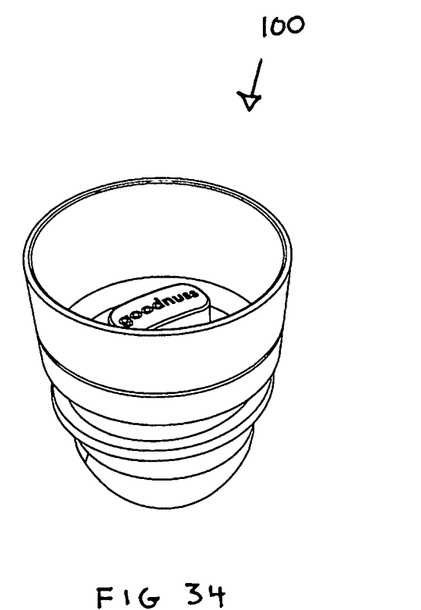
FIG. 34 is a front perspective view of the alternate embodiment torque cap.
Figures 35, 37:
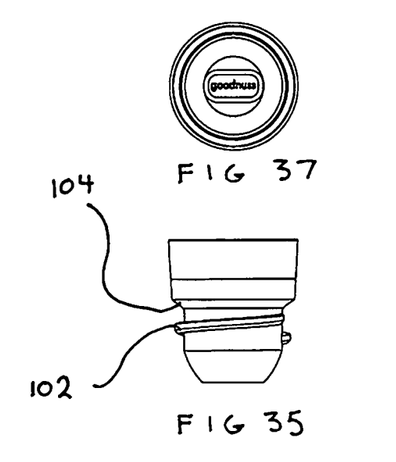
FIG. 35 is a side view of the alternate embodiment torque cap.
FIG. 37 is a top view of the alternate embodiment torque cap.
Figure 36:
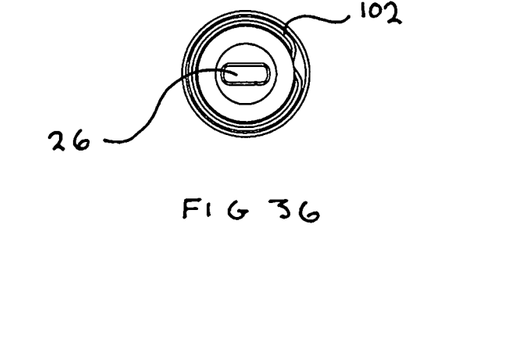
FIG. 36 is a bottom view of the alternate embodiment torque cap.
Figure 38:
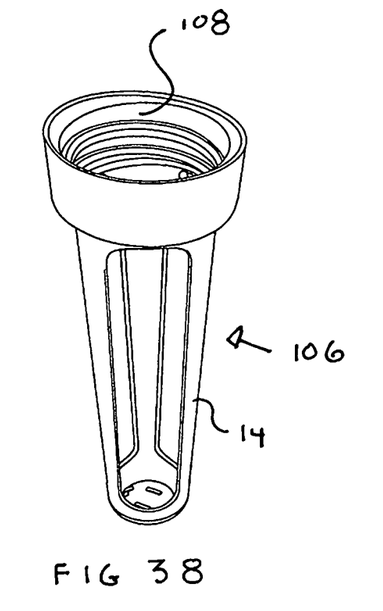
FIG. 38 is a front perspective view of the alternate embodiment nutmilk extraction twist body.
Figure 39:
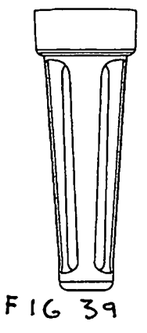
FIGS. 39 and 40 are side views of the alternate embodiment nutmilk extraction twist body.
Figure 40:
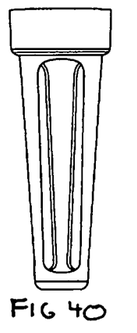
Figure 41:
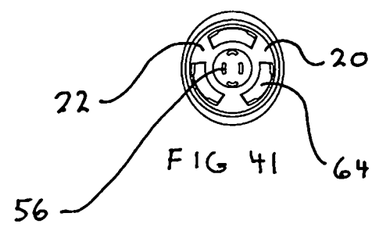
FIG. 41 is a bottom view of the alternate embodiment nutmilk extraction twist body.
Figure 42:
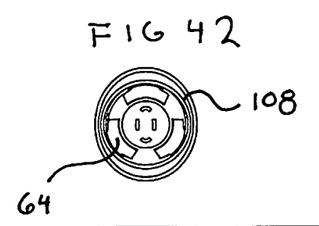
FIG. 42 is a top view of the alternate embodiment nutmilk extraction twist body.

FIG. 29 illustrates that seated into the tapered oval interior face 48 of the top narrowed neck 16 of the vessel 4 hangs suspended, the twist body 6. The twist body 6 (FIGS. 6-10) has an open top and a comprised of a tapered oval upper ring 18 with its exterior surface conformed to fit into the tapered oval interior face 48 of the vessel's neck 16. This oval configuration prevents the twist body 6 from rotating in the collection vessel 4 when torque is applied via the torque cap 8, thus allowing the twist body 6 to twist and shorten, compressing the nut fines. From the oval upper ring 18 extend an evenly spaced series of flexible, twistable, elastically deformable polymer, compression straps 14. The with the proximal ends of the straps 14 connected to the upper ring 18 the remainder of the straps extend downward from the upper ring 18, preferably tapering in width down to their distal ends, all of which are conjoined about an upper edge of a lower ring 20.

The lower ring 20 is affixed to the bottom end of the straps 14 which is approximately centered beneath the upper ring 18 such that their centers align along the linear axis of the twist body 6 and the linear axis of the collection vessel 4. The lower ring 20 has a slot plate 22 with tab recesses 56 formed therethrough that allows the engagement tabs 58 extending from the tab plate 60 of the bottom ring 76 of filter body 17 to pass through, engaging the filter body 17 to the twist body 6 at their lowest, bottom faces. This forces the filter body 17 and the compression straps 14 to twist in unison. As they twist together they spiral inward (toward the linear axis of the collection vessel) into a compact profile such that the majority of the outer surface of the filter bag 17 is overlaid by the compression straps 14. There are also bottom drain orifices 64 formed through the slot plate 22.

The inner face of the oval upper ring 18 is circular and tapers so as to narrow toward the bottom of the filter body 17. This inner face has a series of detents 62 that are radially spaced about the inner face and conformed to meshingly engage the teeth 66 formed on the torque cap 8. This allows the torque cap 8 to be rotated clockwise or counterclockwise and retain its rotated position when the torque is removed from the torque cap. This action functions similar to a ratcheting mechanism of a wrench. There is also a filter body support flange 68 extending normally from the bottom of the inner face of the oval upper ring 18 from which the filter body 17 is supported.

The filter body 17 is a bottom truncated, conical shaped cylindrical filter media 70 (mesh filter bag) affixed to an open top top flange 72 and bottom ring 76. The bottom ring 76 has a tab plate 60 with a series of engagement tabs 58 extending from its bottom face so as to be engageable with the recesses 56 formed on the slot plate 22 of the lower ring 20 of the twist body 6. On the top face of the tab plate 60 is a slot box 78 that matingly conforms to the shape of the bottom end of the torque rod 10.

The top flange 72 of the filter body 17 has an external, upper perimeter ring 74 extending normally from the top edge of the filter assembly. This ring 74 abuts the filter body support flange 68 extending normally from the bottom of the inner face of the oval upper ring 18 so as to allow the removable filter bag 17 to hang between the straps 14 and the lower ring 20. The filter media 70 may be made of any food grade mesh that is washable and exhibits a resistance to tearing when placed under torsion. It may be made from a polymer, a natural fabric, a metal or a steel. Preferably, the filter media 17 is made of a mesh food grade nylon that is electrostatically welded together into its conical configuration, to its upper flange 30 and to its bottom twist flange 36.

The torque cap 6 (FIGS. 25-28) has a recess box 26 open from its bottom face and extending normally upward to partially accept the top end 80 of the torque rod 10. There is a void 28 that exists between the top of the recess box 26 and the top end of the torque rod 10 when the twist body 6 is in its relaxed, untwisted state and the bottom twist tab 82 of the torque rod is inserted in the slot box 78. This void decreases in size as torque is applied between the twist body 6 and the torque cap 8 causing the compression straps 14 to twist, rise and shorten. The torque cap 6 is sized for mating, operational engagement with the twist body 4. The torque cap 8 has a series of teeth 66 formed on its outside perimeter that are matingly conformed to engage the detents 62 on the inner face of the oval upper ring 18 of the twist body 6. In its preferred embodiment, the torque cap 6 is made of polypropylene with a silicon overmold.

The torque rod 10 (FIG. 4) is a rigid polymer linear member (preferably polypropylene) that has a bottom flange 84 with a distal twist tab 82 formed thereon its bottom end, and conformed to fit into the end of the slot box 78. The top end 80 is conformed to fit into the recess box 26 of the torque cap 6. It is to be noted that the length of the torque rod 10 is less than the distance between the top of the recess box and the bottom of the slot box so as to allow a void between the top of the recess box 26 and the top end of the torque rod 10 when the twist body 6 is in its relaxed state.

Operation is simple and best explained with reference to FIGS. 29-33. The twist body 6 is placed into the collection vessel 4 by aligning the oval configurations of the interior face 48 of the collection vessel 4 with the oval upper ring 18 of the twist body 6. The filter body 17 is lowered into the twist body 6 until the filter body hangs from its top flange's upper perimeter ring 74 from the filter body support flange 68 of the twist body 6. The engagement tabs 58 on the bottom face of the tab plate 60 engage the the recesses 56 formed on the slot plate 22 of the twist body 6 so as to lock the bottom ends of the twist body 6 and the filter body 17 together for rotation in unison. The twist tab 82 formed on the bottom of the torque rod 10 is inserted into the slot box 78. The nut fines are added into the top of the filter media so as to reside around the exposed torque rod 10 to the desired level of depth. (This level is adjusted for the discrete amount of milk desired.) (It is to be noted that the nut fines are soaked in a predetermined volume of water, which is retained within the collection vessel.) The exterior configuration of the teeth 66 formed on torque cap 8 is aligned to the series of detents 62 on the inner face of the torque body 6 and conformed to meshingly engage at the same time that the top end 80 of the torque rod 10 is inserted partway into the recess box 26 of the torque cap 8. The torque cap 8 is rotated. (It is to be noted that the top end 80 of the torque rod 10 is engaged only partially into the matingly conformed recess box 26.) A the torque cap 8 is twisted the torque rod 10 turns the tab plate 60 and the slot plate 2 thus transmits the twisting forces from the rotation of the torque cap 8 to the distal end of the twist body 6. This spirally winds the compression straps 14 and the filter bag 17 inward, about the linear axis of the torque rod 10. This minimizes the contained volume of the twist body 6 by drawing it closer to the torque rod and shorting its length. This compresses the contained nut fines so as to force their retained fluid from them. (At this same time the torque rod 10 rises up in the recess box 26 of the torque cap 8.) The torque cap 8 locks its position relative to the twist body 6 when in its in twisted state via the interplay between the detents 62 and the teeth 66.

The extracted nutmilk fluid is free to flow by gravity out of the twisted torque body 6 and filter body 17 so as to accumulate in the collection vessel 4. The ratchet like engagement between the torque cap 8 and the twist body 6 maintains the torque developed in the twist body 6. The twist body 6 and filter body 17 is now raised from the collection vessel 4 and spirally decompressed, and the bottom end of the torque rod is pulled upward removing the filter body 17 from the twist boy 6, dragging the nut fines with it. The exposed torque rod 10 is disengaged from the twist body 6 and removed only during the cleaning process.

In an alternate embodiment, an over-torque protection means prevents the application of excess torque by the manual twisting of the torque cap 8, therein protecting the integrity of the compression straps 14 and the filter bag 17. It is of a simple design based on the tolerance of a matingly conformed internal thread on the inside top of the torque body 6 and external thread on the torque cap 8. Looking at FIGS. 34-37 it can be seen that the alternate embodiment torque cap 100 is identical in all structural respects to the torque cap 8 except for the substitution of the external thread 102 for the teeth 66 formed on the torque cap 8. Similarly the alternate embodiment twist body 106 (FIGS. 38-42) differs structurally only from the twist body 6 by the substitution of the thread groove 108 for the detents 62 formed on the inner perimeter of the oval upper ring 18.

Figure 43:
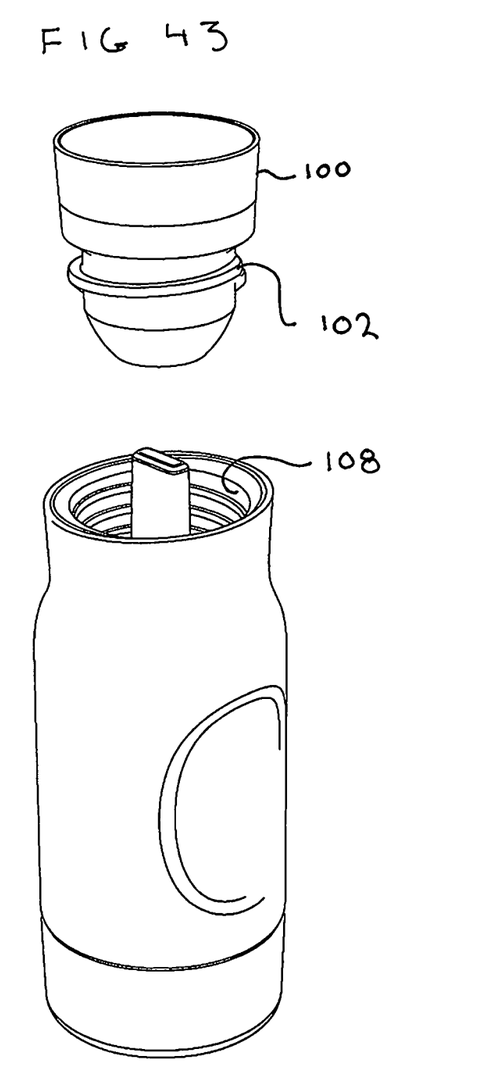
FIG. 43 is is an assembly view of the alternate embodiment twist body going into the vessel.

The pitch and length of this thread 102 and thread groove 108 is calculated to allow the alternate embodiment torque cap 102 to rotate enough to allow the spiral winding of the compression straps 14 and the filter bag 17 inward, about the linear axis of the torque rod 10 enough to compress the maximum amount of nut milk out of the nut fines before the tapered upper flange 104 of the alternate embodiment torque cap 100 seats firmly against the top of the thread groove 108 cut in the alternate embodiment twist body 106. This physical abutment stops all further rotation of torque cap 8 and limits the amount of torque placed on the compression straps 14 and the filter media. (FIG. 43)

System components described according to a particular structural architecture may be organized in alternative structural architectures. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A nutmilk extraction device comprising:
   a collection vessel having an open first top and a closed first bottom;
   a twist body having an open second top from which extends downward a series of twistable compression straps from an upper end of said compression strap, said twist body having a second bottom joined to a lower end of said compression straps, said twist body suspended inside said collection vessel's first top by said twist body's second top;
   a filter body with an open third top affixed to a top end of a cylindrical filter mesh, said filter body also having a third bottom affixed to a bottom end of said filter mesh, wherein said filter body is suspended inside said twist body's second top by said filter body's third top, wherein said third bottom of said filter body is attached to said second bottom of said twist body;
   a torque cap matingly conformed for engagement with said twist body's second top;
   a torque rod having an upper proximal end and a lower distal end, said distal end conformed for engagement with said filter body, and said proximal end conformed for engagement within said torque cap;
   an inwardly tapered neck formed on said collection vessel's first top, said neck having a tapered oval interior face; and
   an externally tapered oval upper ring formed on said twist body's second top, said tapered oval interior face of said inwardly tapered neck matingly conforms for seating of said externally tapered oval upper ring of said twist body's second top into said collection vessel.

2. The nutmilk extraction device of claim 1, further comprising:
   a filter body support flange extending internally from said twist body's upper ring; and
   a top flange formed on said filter body's third top, said top flange having an external ring extending normally therefrom; and
   wherein said external ring abuts said filter body support flange to support said filter body within said twist body.

3. The nutmilk extraction device of claim 2 further comprising:
   a ring formed at said twist body's second bottom, said ring having a slot plate with at least one tab recess formed there through; and
   a tab plate formed on said filter body's third bottom, said tab plate with at least one engagement tab extending therefrom; and
   wherein said at least one engagement tab is matingly sized for locking engagement with at least one tab recess so as to join said filter body's third bottom to said twist body's second bottom.

4. The nutmilk extraction device of claim 3, further comprising:
   a slot box formed on an upper face thereof said filter body's third bottom; and
   a twist tab formed on said torque rod's distal end, said twist tab conformed for engagement with said slot box.

5. The nutmilk extraction device of claim 4, further comprising:
   a recess box formed therein a bottom face of said torque cap; said recess box conformed for mating engagement with said torque rod's proximal end.

6. The nutmilk extraction device of claim 5 wherein said torque rod is a linear member having a length, and said recess box has a top defining a depth and said slot box has a bottom defining a depth, wherein said torque rod's length is less than a distance between said top of said recess box and said bottom of said slot box.

7. The nutmilk extraction device of claim 6, further comprising;
   a series of detents formed on an inner face of said externally tapered oval upper ring; and
   a series of teeth formed on an outside perimeter of said torque cap, said teeth configured for engagement with said series of detents.

8. The nutmilk extraction device of claim 6 further comprising:
   an over torque protection means, said overtorque protection means comprised of an internal thread formed in an inside top of said twist body that matingly conforms to an external thread formed on said torque cap, wherein said external thread and said internal thread both have a pitch and a length that does not allow said torque cap to spirally wind said compression straps and said filter body about said torque rod enough damage said twist body or said filter body.

* * * * *